:(12) United States Patent
Spittle et al.

(10) Patent No.: US 8,805,964 B2
(45) Date of Patent: Aug. 12, 2014

(54) UNIVERSAL WEBSITE PREFERENCE MANAGEMENT

(75) Inventors: J. Frank Spittle, Waxhaw, NC (US);
Jeremy H. Reeves, Harrisburg, NC (US)

(73) Assignee: Bank of America Corporation, Charlotte, NC (US)

( * ) Notice: Subject to any disclaimer, the term of this patent is extended or adjusted under 35 U.S.C. 154(b) by 218 days.

(21) Appl. No.: 13/461,477

(22) Filed: May 1, 2012

(65) Prior Publication Data

US 2013/0297716 A1 Nov. 7, 2013

(51) Int. Cl.
*G06F 15/16* (2006.01)
*G06Q 30/02* (2012.01)
*G06F 21/41* (2013.01)

(52) U.S. Cl.
CPC ............ *G06F 21/41* (2013.01); *G06Q 30/0269* (2013.01)
USPC ............................ 709/219; 709/225; 709/228

(58) Field of Classification Search
CPC ........... G06Q 30/0269; G06Q 30/0222; G06F 21/41; H04N 21/254
USPC .................. 709/217, 219, 223, 225, 227, 228
See application file for complete search history.

(56) References Cited

U.S. PATENT DOCUMENTS

| | | | | |
|---|---|---|---|---|
| 6,047,268 | A * | 4/2000 | Bartoli et al. | 705/35 |
| 6,412,073 | B1 * | 6/2002 | Rangan | 726/5 |
| 7,991,886 | B1 * | 8/2011 | Wu | 709/225 |
| 2002/0143861 | A1 * | 10/2002 | Greene et al. | 709/203 |
| 2004/0003259 | A1 * | 1/2004 | Chang | 713/182 |
| 2006/0271349 | A1 * | 11/2006 | Scanlan | 704/2 |
| 2011/0173102 | A1 * | 7/2011 | Burns et al. | 705/27.2 |

* cited by examiner

*Primary Examiner* — Viet Vu
(74) *Attorney, Agent, or Firm* — Michael A. Springs; Moore & Van Allen PLLC; James C. Edwards

(57) ABSTRACT

Systems, apparatus, methods, and computer program products for universal user website preference management. The invention provides for a user to define website preferences that will be applied universally across multiple websites. The user preferences may be inputted and stored at a universal user preference website or the like. Such user preferences may include a preferred language, a preferred location, preferred billing information, preferred authentication credentials and the like. Through the use of tag parameters, the user preferences may be retrieved and applied at the onset of a user website session, such that the preferences become active when the user initiates website communication.

12 Claims, 7 Drawing Sheets

UNIVERSAL WEBSITE PREFERENCE MANAGEMENT

FIELD

In general, embodiments of the invention relate to computer networks and, more particularly, to managing universal user website preferences that may be set by a user and serve to insure that the user preferences are applied to websites that are associated with the preference managing entity.

BACKGROUND

Traditionally, user preferences as they pertain to web sites are accomplished on a web site-to-web site basis. For example, a user/customer may register with a website and define and save their desired preferences, such as language, location, billing information or the like, in their user profile. In such instances, when the user/customer returns to the web site and authenticates, typically through username and password entry, the previously defined user preferences are automatically activated. In another example, web sites may implement cookies to store data by the website within a browser, and then subsequently send the data back to the website, as a reliable means for websites to remember things that a browser has done in the past, such as actions taken by the user on the website, web pages browsed, user/customer log-in and the like. In this regard, cookies may serve to define some, if not all, user preferences associated with the web site.

However, in both examples provided above problems are apparent. In the user/customer website registration scenario, a user must first register before defining user preferences, as such, if the user is visiting a web site which they have not registered (e.g., a first time visit), no user preferences will exist. Further if the user/customer does not desire to register with a website, due to limit use of the website or as a means of diminishing their online exposure, no user preferences will exist. Moreover, even if the user/customer has registered and defined user preferences, the user preferences may not be activated until the user authenticates or otherwise logs-in to the web site.

In the cookie scenario, third-party tracking cookies may not be desired by the user/customer and, as such, the user may configure their browser to not allow cookies. In addition, cookies tend to be temporary and, as such, may frequently be deleted from the registry.

Therefore, a need exists to develop systems, apparatus, methods, computer program products and the like that provide for user preferences to set and administered across multiple websites. The desired invention should provide for a one-time user/customer definition of preferences that are universal in nature (i.e., can be applied to any and all websites), such that when the user/customer visits a website associated with the universal preferences, the preferences are automatically applied. In addition, the desired invention should apply the universal user preferences at the onset of the website session, such that no further authentication is necessary in order for the preferences to be applied.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for universal user website preference management. The embodiments herein described provide for a user to define website preferences that will be applied universally across multiple websites. The user preferences may be defined (i.e., inputted) and stored at a website or the like. Such user preferences may include a preferred language, a preferred location, preferred billing information, preferred authentication credentials and the like. Through the use of tag parameters, the user preferences may be retrieved and applied at the onset of a user website session, such that the preferences become active when the user initiates website communication. In addition, the user preferences and the user website interaction data (i.e., browsing, purchasing interaction data may be combined to determine targeted marketing offers/advertisements for the user to be presented to a user when visiting a website that utilizes the universal user preferences.

An apparatus for managing universal website preferences provides for first embodiments of the invention. The apparatus includes a computing platform including a memory and a processor in communication with the memory. The apparatus further includes a universal website preference management module that is stored in the memory and executable by the processor. The module is configured to (1) receive inputs that define, for a user, one or more universal website preferences that are configured to be applied to all websites having a predetermined relationship with an entity implementing the module, (2) store, in the memory, the one or more universal website preferences in a user profile associated with the user, (3) receive first tag parameters that indicate that the user is initiating communication with a website having the predetermined relationship with the universal website preference managing entity, (4) retrieve the one or more universal website preferences from the user profile; and (5) communicate second tag parameters, to the website, that indicate the one or more universal website preferences. The website applies the universal website preferences at an onset of a website session conducted by the user without requiring authentication at the website by the user.

In such embodiments of the apparatus, the one or more universal website preferences may include a preferred language, a preferred geographic location (defined by an address, zip code or the like), etc. In additional embodiments of the apparatus, the one or more universal website preferences may include preferred billing information, such that, any electronic commerce conducted at the website provides for pre-population of the billing information entry fields (payment type, account number, address and the like) with the preferred billing information. In still further additional embodiments of the apparatus, the one or more universal website preferences may include authentication credentials (e.g., username and/or password/passcode), such that any website requiring authentication for access or other activities provides for pre-population of the authentication entry fields with the authentication credentials.

In further specific embodiments of the apparatus the universal website preference management module is further configured to receive the first tag parameters in response to the website determining that the user is affiliated with the universal website preference managing entity. In such embodiments of the invention, the determining that the user is affiliated with the universal website preference managing entity may be accomplished by identifying a cookie stored on the user's device such that the cookie identifies the user as a universal website preference participant.

In still further embodiments the apparatus includes a website interaction data collection module that is stored in the memory and executable by the processor. The website interaction data collection module is configured to collect website interaction data related to the website session(s) conducted by the user (i.e., functions performed by the user on the website) and store, in the computing device memory, the website interaction data in the user profile. In such embodiments, the apparatus may further include a targeted offer determination module that is stored in the memory and executable by the processor. The targeted offer determination module is configured to determine one or more targeted offers (e.g., advertisements or the like) to provide to the user during one of the website session or any subsequent website session based on the universal website preferences and the website interaction data.

A method for managing universal user website preferences defines second embodiments of the invention. The method includes (1) receiving inputs that define, for a user, one or more universal website preferences that are configured to be applied to all websites having a predetermined relationship with a universal website preference managing entity, (2) storing, in computing device memory, the one or more universal website preferences in a user profile associated with the user, (3) receiving first tag parameters that indicate that the user is initiating communication with a website having the predetermined relationship with the universal website preference managing entity, (4) retrieving the one or more universal website preferences from the user profile and (5) communicating second tag parameters, to the website, that indicate the one or more universal website preferences. In turn, the website applies the universal website preferences at an onset of a website session conducted by the user without requiring authentication at the website by the user.

In specific embodiments of the method, receiving the inputs further includes receiving the inputs that define the one or more universal website preferences including one or more of preferred language and/or preferred geographic location and/or preferred billing information and/or preferred authentication credentials.

In still further embodiments of the method, receiving first tag parameters further includes receiving the first tag parameters in response to the website determining that the user is affiliated or registered with the universal website preference managing entity. In such embodiments determining that user is affiliated with the universal website preference managing entity may include identifying a cookie stored on a device from which the user is initiating communication with the website, in which, the cookie identifies the user as universal website preference participant.

In still further related embodiments the method includes receiving website interaction data related to the website session conducted by the user and storing, in the computing device memory, the website interaction data in the user profile. In such embodiments the method may further include determining targeted offers to provide to the user during one of the website session or any subsequent website session based on the universal website preferences and the website interaction data.

A computer program product including a non-transitory computer-readable medium defines third embodiments of the invention. The computer-readable medium includes computer-executable instructions to cause a computer to implement the steps of (1) receiving inputs that define, for a user, one or more universal website preferences that are configured to be applied to all websites having a predetermined relationship with a universal website preference managing entity (2) storing the one or more universal website preferences in a user profile associated with the user, (3) receiving first tag parameters that indicate that the user is initiating communication with a website having the predetermined relationship with the universal website preference managing entity, (4) retrieving the one or more universal website preferences from the user profile and (5) communicating second tag parameters, to the website, that indicate the one or more universal website preferences, wherein the website applies the universal website preferences at an onset of a website session conducted by the user without requiring authentication at the website by the user.

Thus, systems, apparatus, methods, and computer program products herein described in detail below provide for universal user website preference management. The invention described herein provides for a user to define website preferences that will be applied universally across multiple websites. The user preferences may be inputted and stored at a universal user preference website or the like. Such user preferences may include a preferred language, a preferred location, preferred billing information, preferred authentication credentials and the like. Through the use of tag parameters, the user preferences may be retrieved and applied at the onset of a user website session, such that the preferences become active when the user initiates website communication. In addition, the user preferences and the user website interaction data (i.e., browsing, purchasing interaction data may be combined to determine targeted marketing offers/advertisements for the user to be presented to a user when visiting a website that utilizes the universal user preferences.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
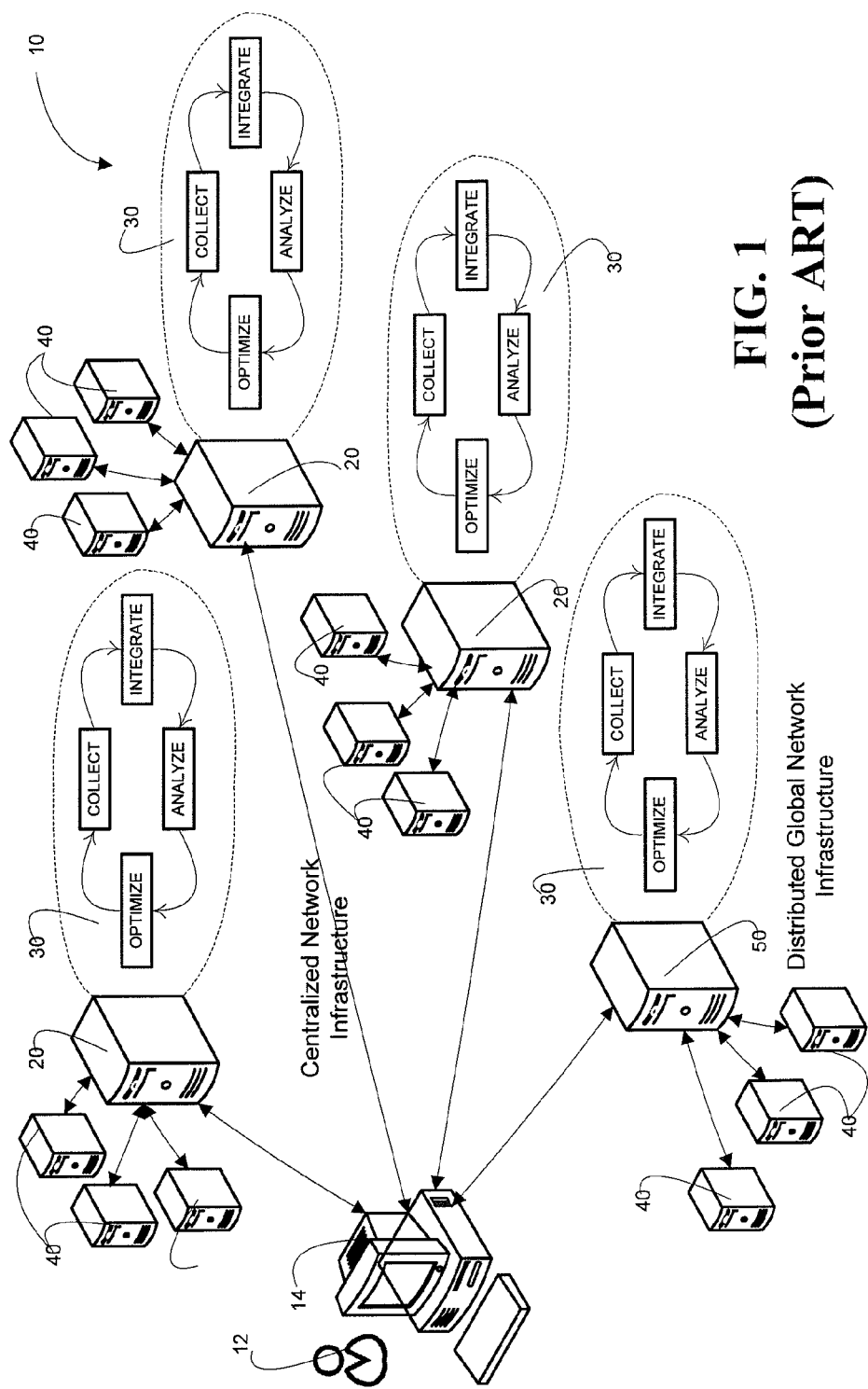
Figure 2:
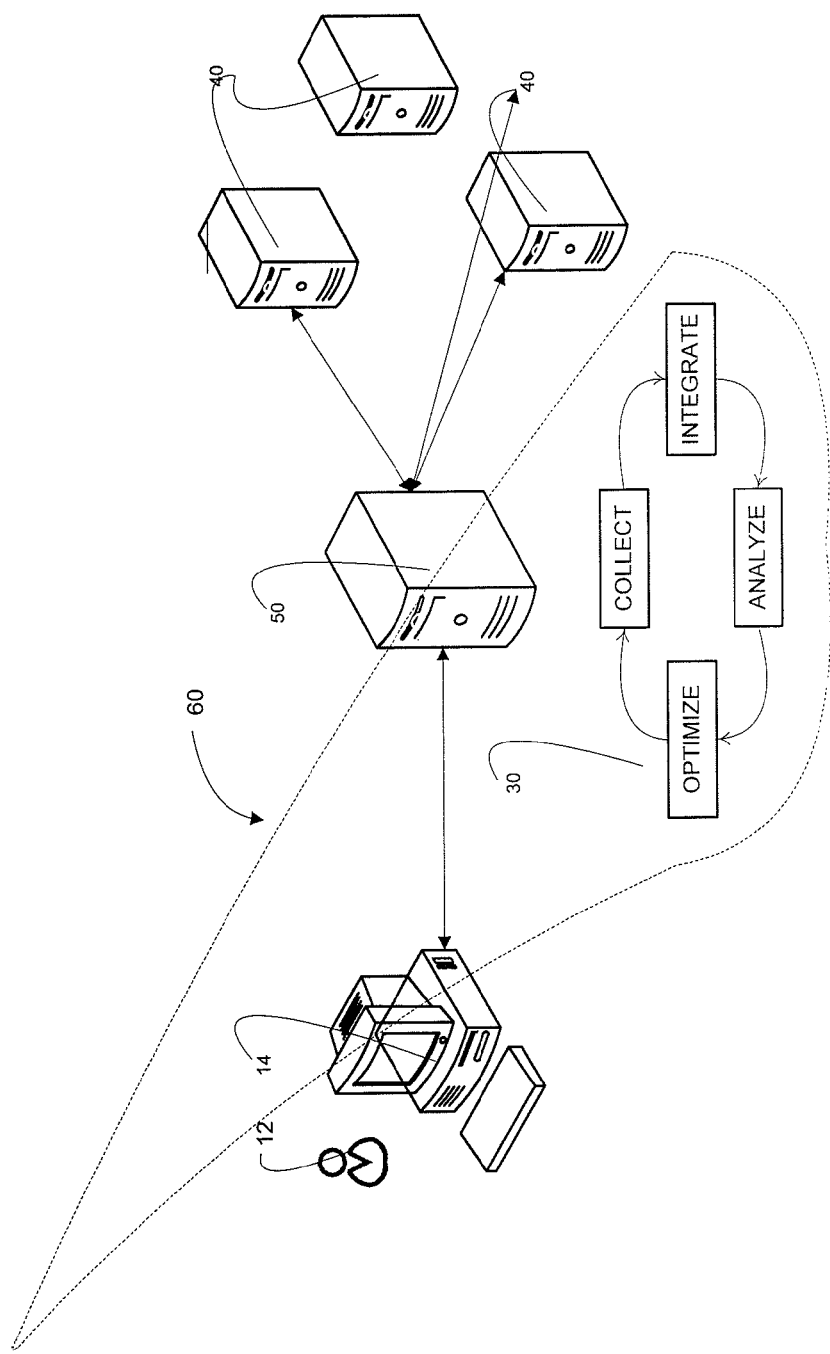
Figure 3:
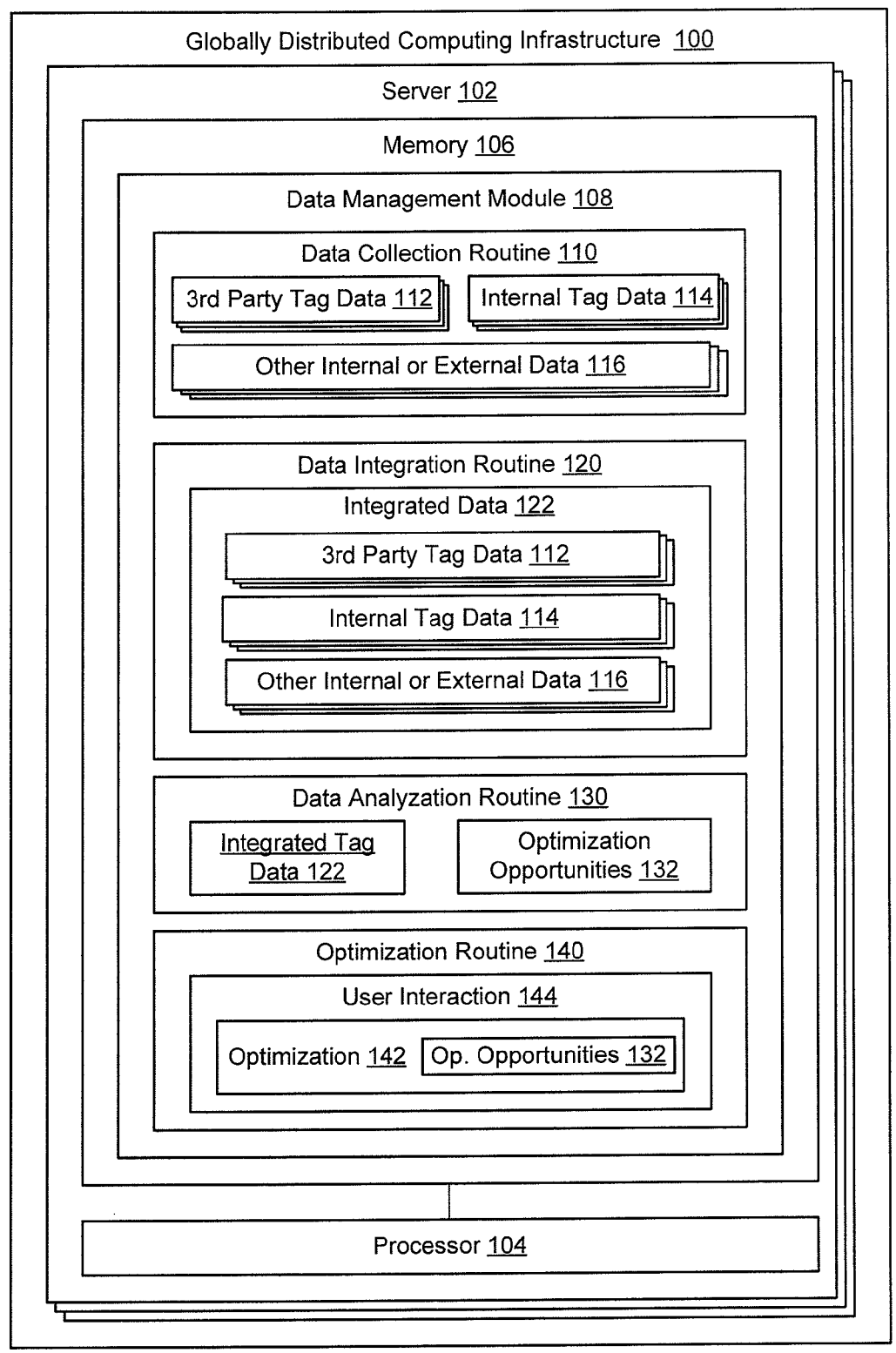
Figure 4:
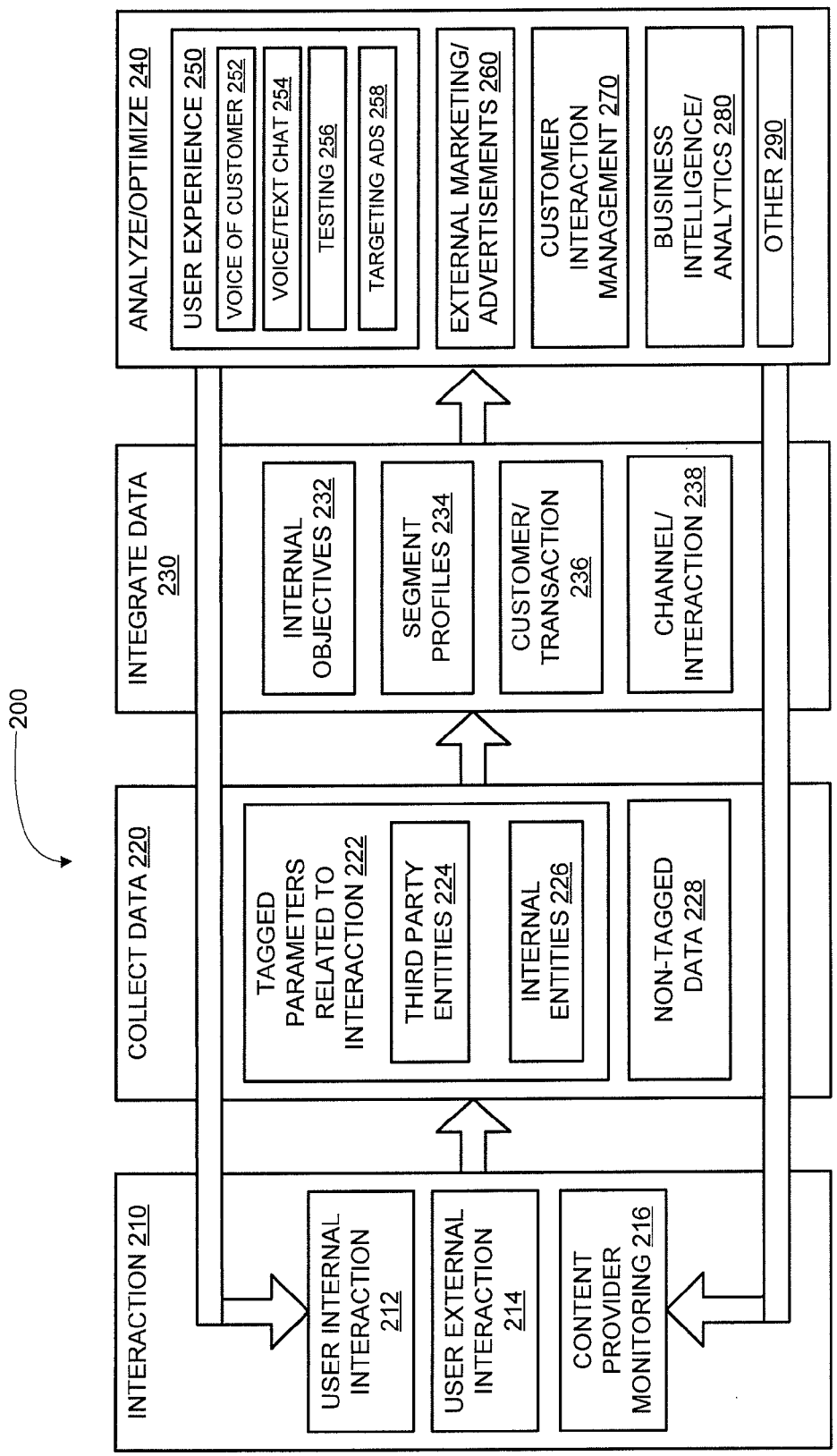
Figure 5:
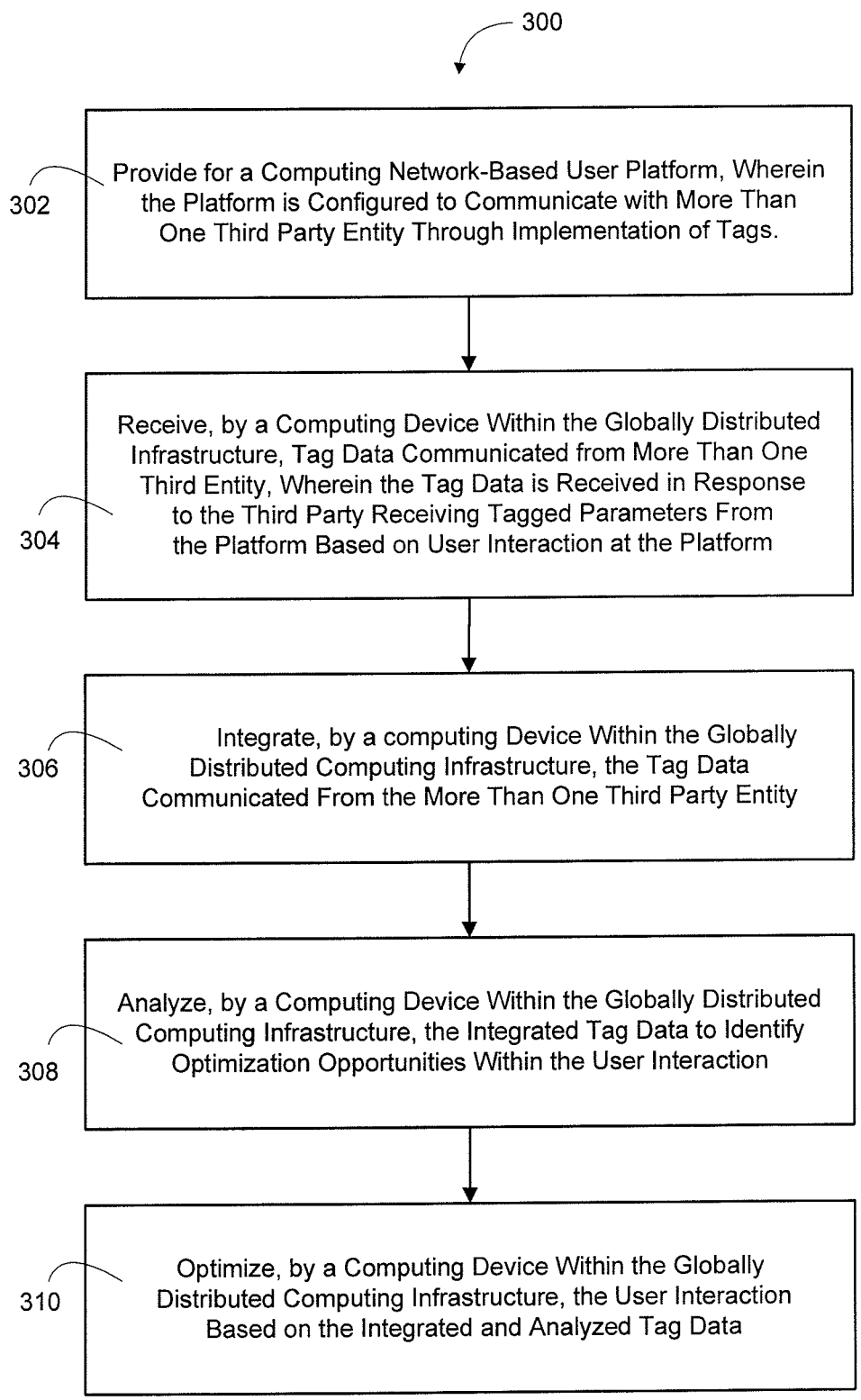
Figure 6:
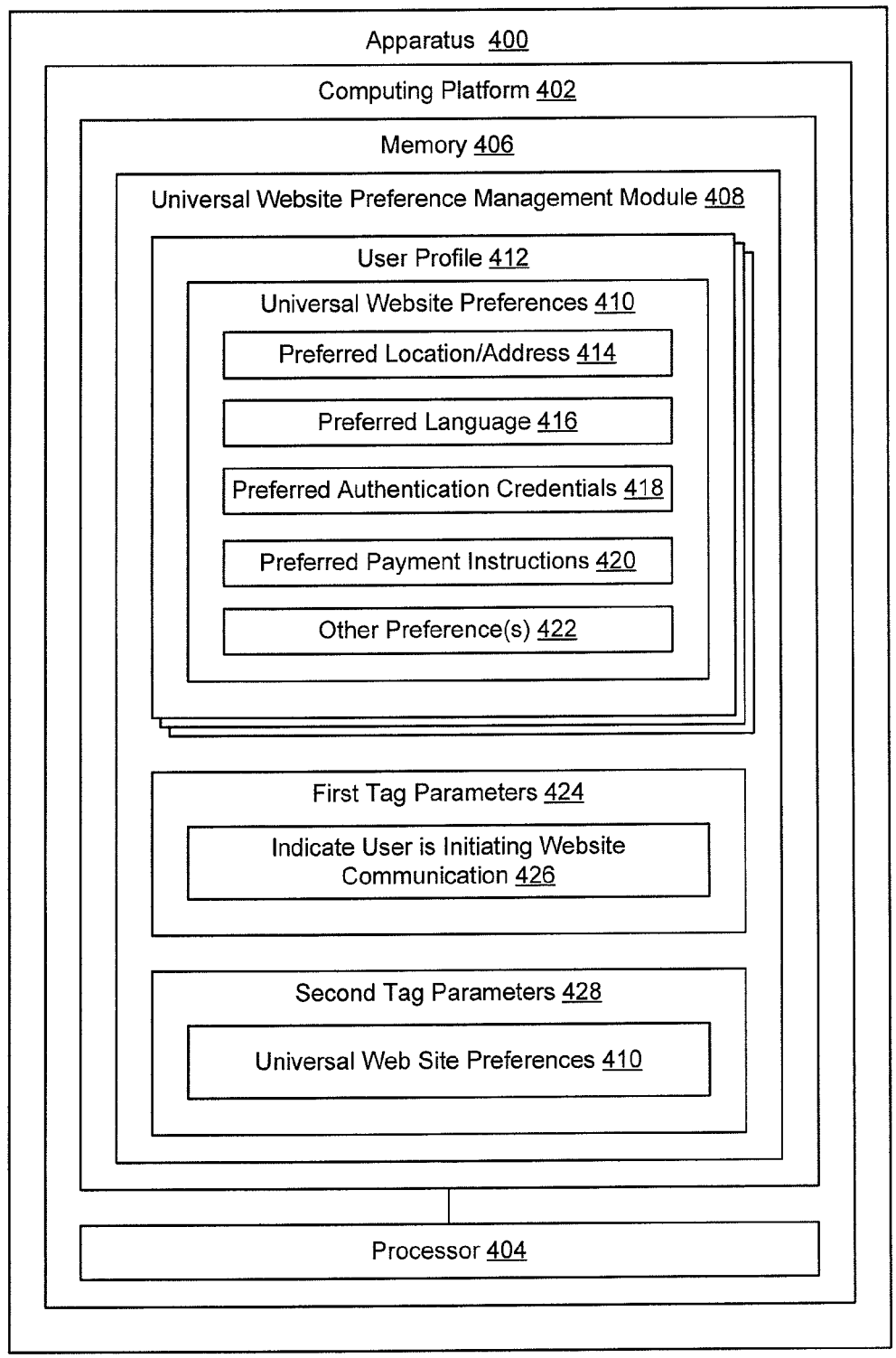
Figure 7:
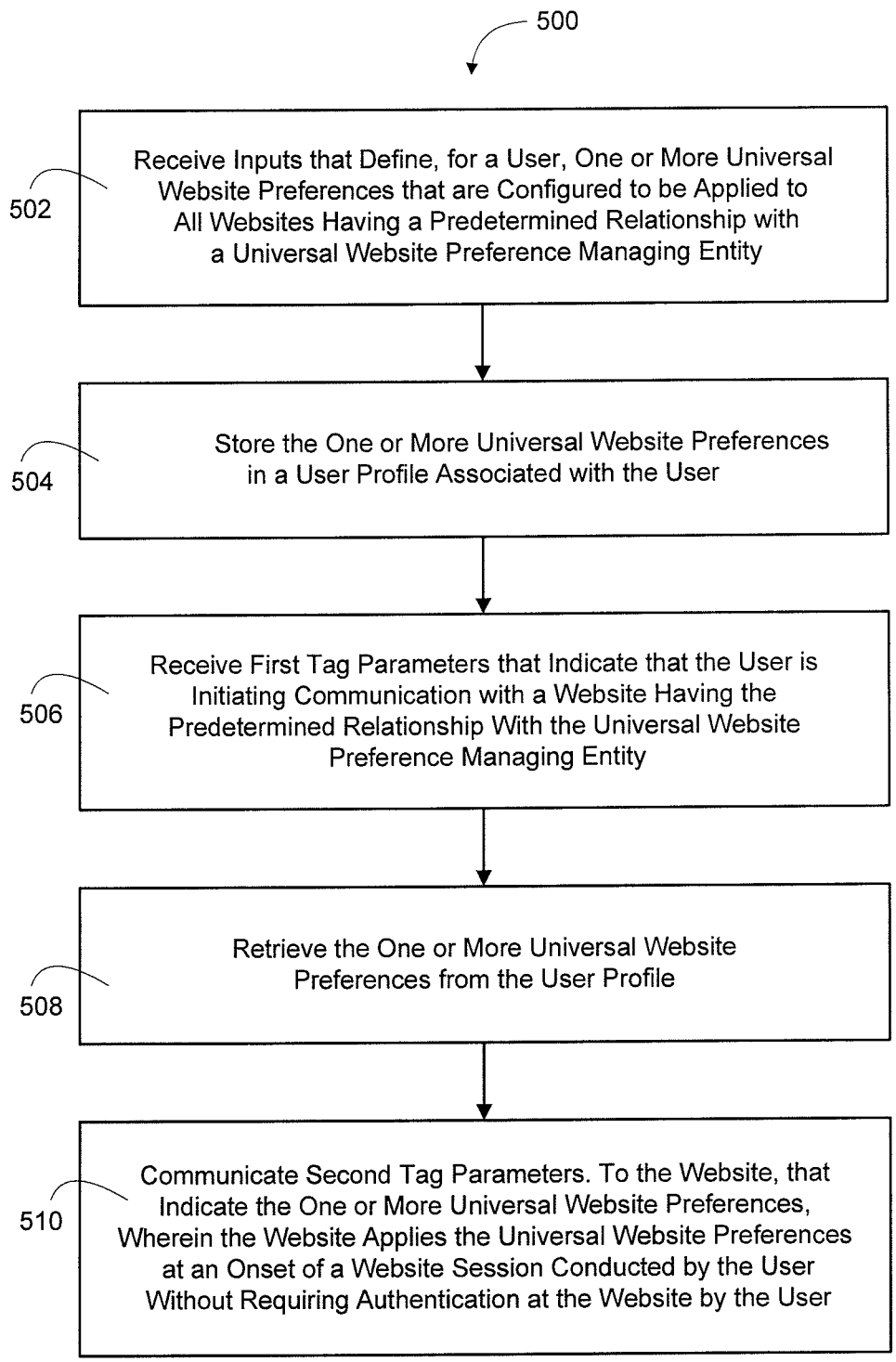

Having thus described embodiments of the invention in general terms, reference will now be made to the accompanying drawings, which are not necessarily drawn to scale, and wherein:

FIG. 1 provides a schematic diagram of a current tagging and data network infrastructure, in accordance with the prior art;

FIG. 2 provides a schematic diagram of tagging and data collection environment in which all processing is conducted within the globally distributed network infrastructure, in accordance with present embodiments of the invention;

FIG. 3 provides a block diagram illustrating a system for tagging and data collection, in accordance with present embodiments of the invention;

FIG. 4 provides a block diagram illustrating the various aspects of optimization cycle, in accordance with embodiments of the present invention;

FIG. 5 provides a flow diagram of a method for tagging and data collection, in accordance with embodiments of the present invention;

FIG. 6 provides a block diagram of an apparatus configured for managing universal user website preferences, in accordance with an embodiment of the present invention; and FIG. 7 provides a flow diagram of a method for managing universal user website preference; in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for tagging and data collection in a distributed computing network environment. Such embodiments of the invention provide for data to be collected from multiple third party entities, analyzed, integrated and optimized at a finite location (i.e., single server or series of servers) within the distributed computing network, such that processing occurs at a location that is geographically proximate to the user/customer. Processing within a distributed network allows for data to be optimized within the timeframe of user's website session, in which the user interaction data is collected, or within real-time or near real-time of the user's website session.

From the business/entity associated with the website perspective, processing the data across a distributed computing network, resolves previous problems related to data usability, such as, for example, automated real-time analysis and integration of data received from different third party entities. As a result of the present invention, data is more easily integrated for reporting and analytics, holistic views of data can be created in a timely fashion, problems with inaccurate data due to redundancy can be lessened or eliminated and/or problems due to data latency (i.e., data not ready for analysis as quickly as desired) can be lessened or avoided. Such benefits are especially beneficial in the mobile platforms, which demand real-time or at least near real-time presentation and optimization of data.

Moreover, by implementing a distributed computing network, a simplified operational environment is realized that benefits from optimized design standards (i.e., reusable and traceable requirements, rules and design standards across all platforms). Such uniformity provides end-to-end governance and reduces incidents of missed requirements. In addition, by eliminating co-existing data processing in a centralized computing network environment the present invention reduces costs by improving quality and reducing redundancy in the tagging infrastructure (e.g., redundant integration and analyzation). In addition, processing tag data proximate to the user's geographic location enables rapid content change to be presented to the user and ensures a consistent and uniform customer website experience/session.

Referring to FIG. 1 a schematic diagram is presented of one current exemplary network environment for tagging and data collection, in accordance with the prior art. Tags, such as JavaScript® tags or the like are implemented as part of a Web browser in order to provide enhanced user interactions and dynamic websites, platforms or the like. In addition to enhancing the user experience, tags power a range of capabilities from the website provider (e.g., e-commerce business or the like) perspective. These capabilities include analytics data collection, testing and targeting, Voice of Customer (VOC), survey, chat functions, etc. Website pages are "tagged" with third-party and internal code which enable optimization of offsite and on-site functions. Tags may be configured to collect information related to the user's interaction with the website, which is passed to the third party or internal entity for processing in accordance with the function provided by the third party or internal entity. The results of such processing are returned to the website provider for integration, analyzation and optimization of the user's web site experience, optimization of other web-related/platform-related functions and/or optimization of other non-website-related functions associated with the web-site provider.

The current network environment for tagging and data collection is highly complex and inefficiently managed; negatively impacting the cost to provide services, the user experience and security risk. A user 12 in in communication with computing device 14, which provides the user network access to a user platform, such as a website provider by a website provider. The website may implement both third-party entity tags and internal tags and the processing of such diverse tags may occur across different network entities. For example, content delivered to the website through internal tags and/or a portion of the third party entity tags may be managed through a conventional centralized network infrastructure, having a finite number of data centers. The data centers may be physically located anywhere, such that processing occurs at any given data center irrespective of the physical location of the user 12. In the illustrated example of FIG. 1 three servers 20 are shown which represent three separate data centers. One or more of the servers 20 may be implemented during the user experience at the website to process tag-related information. Each of the data center servers 20 are in network communication with a plurality of downstream network devices 40, which may be third-party entity processing devices and/or internal entity processing devices.

Each of the data center servers 20 in the centralized network environment may implement a separate optimization cycle 30. The optimization cycle 30 includes collecting processed data from the third party entities or internal entities, integrating the data, analyzing the integrated data for optimization opportunities and optimizing the user experience.

In addition, other third party entities may manage tag content through a globally distributed network. The globally distributed network provides for data processing to occur at a location that is geographically proximate to the end user 12. In a globally distributed network the server 50 is capable of collecting and caching content at the edge of the network for superior whole site delivery. In addition, the edge server 50 pulls data from downstream servers 30 as needed via an optimized data connection 30. The edge server 50 implements its own optimization cycle 30. Similar to the previously discussed optimization cycles 50, the optimization cycle 30 includes collecting processed data from the third party entities or internal entities, integrating the data, analyzing the integrated data for optimization opportunities and optimizing the user experience.

The separate optimization cycles shown in FIG. 1, spread out throughout both the centralized and distributed network infrastructures results in data that is not easily connected or integrated across multiple third party or internal entities. As such, manual efforts may be implemented to integrate data across multiple third party and/or internal entities for reporting and/or analytics analysis. In addition, tagging and data processing via both the centralized and distributed network infrastructures is time prohibitive, such that, opportunities to optimize a user experience during the session in which data is captured may not be realized if the inability exists to quickly create holistic views of data. Moreover, the current network infrastructure is susceptible to missing data, inaccurate data and redundancy in data collection. Such inaccuracies and redundancy negatively impact the confidence of reporting and analytics results and may impact business decisions.

Referring to FIG. 2 a schematic diagram is presented of a tagging and data collection environment 60 in which only the globally distributed network is implemented to manage content; in accordance with embodiments of the present invention. In such embodiments, the user 12 interacts with the content provider via a computing device 12 which provides the user access to the content provider's website or other networked platform. The computing device 14 is in network communication with edge server 50 which is configured to manage all content distribution to the computing device, including management of all tag data, including third party entity tag data and internal tag data. As provided for by a globally distributed network, the edge server 50 in which the computing device 14 is in communication with is proximate in location to the computing device 14, so as to insure timely delivery of content to the computing device 14.

The edge server 50 implements a data management module that is configured to provide optimization cycle 30. In this regard, the edge server 50 collects tag data from all of the third party entities and internal entities implementing tags on the website (shown as downstream servers 40). In addition, the edge server may collect other data from other third party entities (also, shown as downstream servers 40), such as social media data collected from websites or the like. All, or at least a portion, of the collected data may then be integrated at the edge server 50, such that, data collected from different third party entities and/or third party entities and internal entities may be integrated to allow for subsequent analysis of blended or integrated data from more than one third party entity and/or a third party entity or entities and an internal entity or entities.

The integrated data is then analyzed to determine optimization opportunities. The optimization opportunities may be related to the user interaction with the website, such as chat sessions, targeted marketing/advertising or the like, the website provider's marketing or business concerns; such as Voice of Customer (VOC), testing, external marketing channels, business intelligence/analytics or the like.

The distributed tagging and analytics infrastructure shown in FIG.2 enables optimization to occur within a timeframe of the current user experience, and in specific embodiments within real-time or near real-time of communicating tag data from the computing device 14 to the edge server 50. Such a concentric approach to managing tags, data collection and content distribution improves performance, reduces cost, improves content delivery speed and improves the overall user experience. The simplified approach improves performance with optimized design standards, reduces costs by improving quality and reducing redundancy in the tagging infrastructure. In addition the concentric globally distributed network approach enables rapid content changes by automating tag management and ensures a consistent and uniform customer experience.

Referring to FIG. 3 a block diagram is presented of a globally distributed computing infrastructure 100 including a plurality of edge servers 102 which are configured to provide tagging, data collection and content management, in accordance with embodiments of the present invention. The server 102 may include any type and/or combination of one or more computing devices. The server 102 is operable to receive and execute modules, routines and applications, such as data management module 108 and the like.

Edge server 102 includes memory 106, which may comprise volatile and nonvolatile memory such as read-only and/or random-access memory (RAM and ROM), EPROM, EEPROM, flash cards, or any memory common to computer platforms. Further, memory 106 may include one or more flash memory cells, or may be any secondary or tertiary storage device, such as magnetic media, optical media, tape, or soft or hard disk.

Further, server 102 also includes processor 104, which may be an application-specific integrated circuit ("ASIC"), or other chipset, processor, logic circuit, or other data processing device. Processor 104 or other processor such as ASIC may execute an application programming interface ("API") layer (not shown in FIG. 3) that interfaces with any resident programs, such as data management module 108 or the like, stored in the memory 106 of server 102. Processor 104 includes various processing subsystems (not shown in FIG. 3) embodied in hardware, firmware, software, and combinations thereof, that enable the functionality of server 102 and the operability of the apparatus on a network. For example, processing subsystems allow for initiating and maintaining communications, and exchanging data, with other networked devices. Additionally, processing subsystems may include any portion of the functionality of data management module 108 obviating the need for such applications and modules to be stored in the memory.

Memory 106 stores data management module 108, which is configured to provide a concentric approach to tag data collection and content delivery, in accordance with embodiments of the present invention. The module 108 includes data collection routine 110 which is configured to collect or otherwise receive third party entity tag data 112 and/or internal tag data 114, in response to the third party entities or internal entities receiving tagged parameters from the website or other platform based on a user interaction at the website or platform. In addition, data collection routine 110 may be configured to collect or otherwise receive other data from other internal or external entities. For example, external user interactions at other websites, such as social media websites or the like may prompt collection or receipt of data by the data collection routine. In addition, platform or website monitoring data may be collected or otherwise received at collection routine 110.

Data management module 108 additionally includes data integration routine 120 that is configured to integrate data from multiple third party entities and/or multiple internal entities. Integration of data provides for data from different sources to be combined for subsequent optimization. In addition, integration allows for data to be delivered to various different platforms, such as online, mobile and the like. Thus, the integrated data 122 may include third party entity tag data 112, internal tag data 114 and other third party (external) data or internal data, as discussed above in relation to collection routine 110.

Further, data management routine 140 includes data analyzation routine 130 which is configured to analyze the integrated data 122 (as well as non-integrated data) to determine optimization opportunities 132. As previously noted, the optimization opportunities 132 may be related to the user interaction with the website, such as chat sessions, targeted marketing/advertising or the like. In other embodiments of the invention, optimization opportunities 132 may be outside the realm of the user interaction/experience, for example, optimization opportunities 132 may include the website provider's marketing or business concerns; such as Voice of Customer (VOC), testing, external marketing channels, business intelligence/analytics or the like.

Lastly, and as a means of completing the optimization cycle, the data management module 108 includes optimization routine 140 which is configured to perform optimization 142 on the user interaction 144 at the website or other platform based on the determined optimization opportunities 132. In certain embodiments of the invention the optimization may occur within the timeframe of the user interaction/session that prompted the tag data being sent to the third party tag processing entities and/or internal tag processing entities. In specific embodiments of the invention, the optimization may occur in real-time or near real-time to within one of real-time or near real-time to the user interaction that prompted tag data being sent to the third party tag processing entities and/or internal tag processing entities. In such embodiments, data collection, data integration and data analyzation must also be conducted in real-time or near real-time to provide the requisite optimization to occur in real-time or near real-time.

Turning the reader's attention to FIG. 4, a modified block diagram/flow diagram is presented of a process 200 for tagging, data collection and optimization cycling, in accordance with embodiments of the present invention. At Block 210, an interaction 210 occurs by a user or by the content provider. User interactions may include an internal user interaction 212, such as actions conducted by the user on the content provider's website. Such actions may trigger a tag routine to send data to a third party entity or an internal entity. In addition, the user interaction may include an external user interaction 214, such as actions conducted by the user at a social network web site or the like. Moreover, interactions 210 may include content provider monitoring such as monitoring the actions performed by a user when conducting a user session/experience at the content provider's website or the like, such that the results of the monitoring form the basis for an interaction.

At Block 220 data is collected at one of a plurality of edge servers in the globally distributed computing network. The edge server which collects the data and further process the data is located geographically proximate to the location of the user for the purpose of ensuring timely optimization cycling. The collected data may include tagged parameters 222 related to the internal or external user interactions 214 and/or 214. The tagged parameters may be collected or otherwise received in response to the user interaction prompting communication of tag data to a third party entity or an internal entity. As such, the tagged parameters may be collected or otherwise received from third party entities 224 or internal entities 226. The third party entities may include, but are not limited to, social media sites, chat service providers, real time research entities, survey providers, paid media providers, test providers and the like. The internal entities may include, but are not limited to, business and performance metric monitoring and reporting entities, business event reporting entities, and the like. In addition, other non-tag related data 228 may be collected. For example if the content provider is, by way of example, a financial institution, the internal data may be transaction data, such as payment data, transfer data, personal financial management data or the like provided by third party services and/or provided internally.

At Block 230, the collected data is integrated. The data may be integrated and combined according to one or more objectives. As shown, the data may be integrated based on content provider objectives 232, customer (i.e., user)-based or transaction-based integration 234, channel interaction-based 236 (e.g., online versus mobile platform or the like) or integrated based on segment profile-based 238 (e.g., user demographics or the like).

At Block 240, the integrated data is analyzed for optimization opportunities and the optimization is conducted. The optimization may include optimizing the user experience 250 at the website or other platform. Optimization of the user experience 250 may include voice of the customer 252, voice/text chat 254, testing 256 and targeting marketing/advertisements 258. In addition, optimization may include external marketing/advertisement 260, which provides insight into how, when and to whom advertisements are placed on websites other than the content provider's website. In addition, optimization may include business intelligence/analytics 280, which may include integrated management reporting, marketing reporting and the like and customer interaction management 270. Moreover, other types of optimization 290 (not shown in FIG. 4) may also be contemplated, and within the inventive concepts herein disclosed. For example, platform monitoring and, in those instances in which the content provider is a financial institution, personal financial management may be optimized.

Referring to FIG. 5 a flow diagram is provided of a method 300 for tagging and data collection, in accordance with embodiments of the present invention. At Event 302 a computing network-based user platform is provided. The platform is configured to communicate with one or more third parties and/or one or more internal through implementation of tags. The platform may be a website, a transaction interface (e.g., point of sale device, Automated Teller Machine (ATM) or any computing network-based user platform that is conducive to user interaction.

At Event 304, tag data communicated from one or more third party entities and/or internal entities is received by a computing device, such as an edge server or the like, within a globally distributed computing network infrastructure. The tag data is received in response to the third party entity receiving tag parameters from the platform based on user interaction at the platform (e.g., specific user actions at a website, such as pages accessed, links activated and the like). In specific embodiments of the method, the received or otherwise collected data may come from other internal or external entities or sources which are not related to tagging. For instance, in the financial institution example, the data may transaction data, such as payment data, transfer data or the like associated with the user.

At Event 306, at least a portion of the tag data communicated from the third party entities and/or the internal entities is integrated by a computing device within the globally distributed computing network infrastructure. As previously noted integrated the data may include combining data from more than one entity. In specific embodiments the integration may take into account content provider objects, segment profiles, the user, the transaction/experience, the channel for presenting the interaction and the like.

At Event 308, the integrated tag data is analyzed by a computing device within the globally distributed computing network infrastructure to identify optimization opportunities. The optimization opportunities may be associated with the user experience or they may be associated with the third party or internal marketing channels, business intelligence/analytics, customer interaction management, platform monitoring or the like.

At Event 310, the user interaction is optimized based on the identified optimization opportunities. Optimization of the user interaction may include, but is not limited to, optimizing the user presentation, a providing and/or optimizing a user chat/text session, or providing the user with optimized/targeted advertising.

In specific embodiments of the method, the receiving, integrating, analyzing and optimizing events occur at least within a timeframe of a user session that includes the user interaction. For example, within a timeframe of a user experience that included the user interaction that prompted tag parameters being communicated to the third party entities. In still further specific embodiments of the method, the receiving, integrating, analyzing and optimizing events occur within one of real-time or near real-time to the user interaction.

In other alternative embodiments the method includes monetizing the integrated and analyzed tag data, such that the integrated and, in some instances, analyzed data is used by the content provider as a revenue stream (i.e., sold to a third party). In such embodiments the integrated and, in some instances analyzed data may be combined with other content provider internal data for the purposes of monetization. In specific embodiments of such a method, in which the content provider is a financial institution, the internal data that is combined with the tagged data may be transaction history data associated with the user/customer conducting the user experience.

Further embodiments of the present invention provide for universal user website preference management. In such embodiments, a user defines website preferences and the preferences are applied universally across multiple websites. The user preferences may be defined e., inputted) and stored at a managing entity website or the like. Such user preferences may include a preferred language, a preferred location, preferred billing information, preferred authentication credentials and the like. Through the use of tag parameters, the user preferences may be retrieved and applied at the onset of a user website session, such that the preferences become active when the user initiates website communication. In addition, the user preferences and the user website interaction data (i.e., browsing, purchasing interaction data may be combined to determine targeted marketing offers/advertisements for the user to be presented to a user when visiting a website that utilizes the universal user preferences.

Referring to FIG. 6, a block diagram is presented of an apparatus 400 configured to provide universal website preference management, in accordance with embodiments of the present invention. The apparatus 400 may include any type and/or combination of one or more computing devices. The apparatus 400 is operable to receive and execute modules, routines and applications, such as universal website preference management module 408 and the like.

The apparatus 400 includes computing platform 402 that can receive and execute routines and applications. Computing platform 402 includes memory 406, which may comprise volatile and nonvolatile memory such as read-only and/or random-access memory (RAM and ROM), EPROM, EEPROM, flash cards, or any memory common to computer platforms. Further, memory 106 may include one or more flash memory cells, or may be any secondary or tertiary storage device, such as magnetic media, optical media, tape, or soft or hard disk.

Further, computing platform 402 also includes processor 404, which may be an application-specific integrated circuit ("ASIC"), or other chipset, processor, logic circuit, or other data processing device. Processor 404 or other processor such as ASIC may execute an application programming interface ("API") layer (not shown in FIG. 6) that interfaces with any resident programs, such as universal website preference management module 408 or the like, stored in the memory 406 of apparatus 400. Processor 404 includes various processing subsystems (not shown in FIG. 6) embodied in hardware, firmware, software, and combinations thereof, that enable the functionality of apparatus 400 and the operability of the apparatus on a network. For example, processing subsystems allow for initiating and maintaining communications, and exchanging data, with other networked devices. Additionally, processing subsystems may include any portion of the functionality of universal website preference management module 408 obviating the need for such applications and modules to be stored in the memory.

Memory 106 stores universal website preference management module 408 which is configured to manage universal website preferences for users. In certain embodiments the module is available to the users through an Internet-based website or some other network entity. In specific embodiments of the invention, the universal website preference management module 408 may be available as a service within another online service provider, such as an online or mobile banking service or the like.

As such, users access the universal website preference management module 408 to define their universal website preferences 410 and, once defined, the preferences are stored in a user profile 412. The user profile may be a stand-alone user profiles associated with only the universal website preferences 410 or the user profile may be a more generic user profile 412, such as a general customer/user profile, which includes other personal information and/or customer transaction information.

The universal website preference managing entity may preconfigure a selection of user preferences or, in other embodiments, the user may be able to define their own unique preferences to meet their needs. Universal website preferences 410 may include, but are not limited to, preferred location/address 414, preferred language 416, preferred authentication credentials 418, preferred payment instructions 420, and any other preferences as configured by the managing entity or defined by the user. A preferred location/address 414 allows the user to access a website and be provided with location-specific information (e.g., closest retail location associated with the website, etc.) without having to further input an address at the website. A preferred language 416 allows the user to access a website with having to initially choose a language/country/geographic region. Preferred authentication credentials 418 allows the user to automatically authenticate upon initiating website communication, such that website-specific user preferences may be presented to the user without requiring further authentication (in other embodiments, in which the website is not configured to allow for automated authentication the universal authentication credentials may pre-populate the log-in entry fields required for authentication. Preferred payment instructions 420, which may include billing account number, user shipping address, user billing address and the like, allow the user to conduct purchase transactions at the website without having to provide/enter any additional information.

Once defined and stored in the user profile 412, universal website preferences may be applied to websites visited by the user, which have a pre-existing relationship with the universal website preference managing entity. In specific embodiments, the pre-existing relationship may provide for the universal website preference managing entity to execute tags on the website as a means of identifying a user who desires to communicate with the website and who has previous defined universal website preferences, and communicating such website preferences to the website. As such universal website preference managing module 408 is configured to receive first tag parameters 424 from a website having a pre-existing relationship with the universal website preference managing entity. The first tag parameters 424 indicate that the user is initiating communication with the website 426.

In specific embodiments receipt of the first tag parameters 424 by the managing entity indicate that the user has previous defined universal website preferences 410. In such embodiments, the managing entity may place a cookie or some other executable application on the user's device at the time the user enrolls (i.e., defines preferences) in the universal website preference program, which serves to acknowledge the user, or more precisely, the user's device, as a universal website preference program participant. In such embodiment's multiple user device's (e.g., personal computer, laptop computer, mobile device(s) may be configured so as to acknowledge the user as a universal website preference participant). In other embodiments of the invention, receipt of the first tag parameters 424 will prompt the module 408 to determine if the user or more precisely, the user's device is a registered participant (i.e., has defined universal website preferences 410 and, as such, has a user profile 412).

Once the module 408 has received the first tag parameters 424 and retrieved the universal website preferences 410 from the user's profile 412, the module will communicate second tag parameters 428 to the website that indicate the user's defined universal website preferences 410. Upon receipt, the website applies the universal website preferences 410 at the onset of the user's website session without requiring further authentication at the website by the user.

FIG. 7 is a flow diagram depicting a method 500 for managing universal website preferences, in accordance with embodiments of the present invention. At Event 502 one or more inputs are received that define a user's universal website preferences. Such inputs may be received at universal website preference website or the like, which may be implemented in conjunction with other website services, such as online/mobile banking or the like. The Universal website preferences are configured to be applied to all of the websites visited by the user that have a pre-existing relationship with the universal website preference managing entity. In specific embodiments the pre-existing relationship may provide for information exchange between the website and the universal website preference managing entity, such information may not be limited to user's universal website preferences but may also include other user or group demographic information which may be of benefit to the website. Further, the pre-existing relationship may provide for tagged communication between the website and the universal website preference managing entity as a means of notifying the universal website preference managing entity that a user is initiating website communication and for communicating the user's universal website preference from the managing entity to the website.

As previously noted the universal website preferences may include, but are not limited to, preferred location/region/address, preferred language, preferred authentication credentials, preferred billing information or the like. By providing for universal website preferences the user is not burdened or otherwise presented with the security risk associated with setting up and maintaining user profiles and preferences at each individual website.

At Event 504, once the universal website preferences have been defined, the preferences are stored in a user profile associated with the user. The user profile may be an independent website preference profile or a general profile associated with the user, such as an online/mobile banking user profile or the like.

At Event 506, the universal website preference managing entity receives first tag parameters that indicate that the user is initiating communication with a website that has the requisite pre-existing relationship with the universal website preference managing entity. In further embodiments, the first tag parameters are received in response to the website determining that the user is affiliated with the universal website preference managing program. In specific embodiments of the invention, such a determination may include identifying a cookie stored on the device from which the user is initiating communication, such that the cookie is configured to identify the user (i.e., the user's device) as a universal website preference participant. As previously noted, in alternative embodiments, determination that the user is affiliated with the universal website preference managing program may occur by the managing entity upon receipt of the first tag parameters.

At Event 508, the universal website managing entity retries the one or more universal website preference form the user profile and, at Event 510, communicates second tag parameters to the website. The second tag parameters indicate the one or more universal website preferences. Upon receipt, the website applies the universal website preferences at the onset of the website session initiated by the user without requiring any action (i.e., authentication, data input or the like) by user. Implementation of such a universal website preference program at an edge server within a distributed computing infrastructure provides for the real-time processing necessary to insure that the universal website preferences are retrieved and applied at the onset on the user's website session.

In further alternate embodiments of the method, the user's website interaction data is received and stored in the user profile. The website interaction data is related to the functions performed by the user while visiting the website. In such embodiments, targeted offers or other user-specific information may be determined for the user based on the universal website preferences and the website interaction data. Such targeted offers or other user-specific information may be presented to the user during the current website session or during any subsequent website session.

Thus, systems, apparatus, methods, and computer program products herein described in detail below provide for universal user website preference management. The invention described herein provides for a user to define website preferences that will be applied universally across multiple websites. The user preferences may be inputted and stored at a universal user preference website or the like. Such user preferences may include a preferred language, a preferred location, preferred billing information, preferred authentication credentials and the like. Through the use of tag parameters, the user preferences may be retrieved and applied at the onset of a user website session, such that the preferences become active when the user initiates website communication. In addition, the user preferences and the user website interaction data (i.e., browsing, purchasing interaction data may be combined to determine targeted marketing offers/advertisements for the user to be presented to a user when visiting a website that utilizes the universal user preferences.)

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus for managing universal user website preferences, the apparatus comprising:
   a computing platform including a memory and a processor in communication with the memory; and
   a universal website preference management module stored in the memory, executable by the processor and configured to:
   receive inputs that define, for a user, one or more universal website preferences that are configured to be applied to all websites having a predetermined relationship with an entity implementing the module, wherein inputs define the universal website preferences that include user-defined preferences, a preferred geographic location, a preferred language, and preferred authentication credentials,
   store, in the memory, the one or more universal website preferences in a user profile associated with the user,
   determine that the user is a universal website preference participant by identifying a cookie stored on a device from which the user is initiating communication with one of the websites having the predetermined relationship with the entity implementing the module, wherein the cookie identifies the user as the universal website preference participant;
   in response to determining that the user is a universal website preference participant, receive, at an edge server, first tag parameters that indicate that the user is initiating communication with one of the websites having the predetermined relationship with the universal website preference managing entity,
   retrieve the one or more universal website preferences from the user profile; and
   communicate, from the edge server, second tag parameters, to the website, that indicate the one or more universal website preferences, wherein the website applies the universal website preferences, including the user-defined preferences, the preferred authentication credentials, the preferred language and the preferred geographic location, at an onset of a website session conducted by the user without requiring any input or authentication at the website by the user, wherein application of the preferred geographic location provides for location-specific information specific to the preferred geographic location to be provided during website communication and application of the preferred language provides for content presented on the website to be presented in the preferred language during the website communication.

2. The apparatus of claim 1, wherein the module is further configured to receive the inputs that define the one or more universal website preferences, wherein the preferences include preferred billing information.

3. The apparatus of claim 1, further comprising a website interaction data collection module stored in the memory, executable by the processor and configured to receive website interaction data related to the website session conducted by the user and store, in the computing device memory, the website interaction data in the user profile.

4. The apparatus of claim 3, further comprising a targeted offer determination module stored in the memory, executable by the processor and configured to determine one or more targeted offers to provide to the user during one of the website session or any subsequent website session based on the universal website preferences and the website interaction data.

5. A method for managing universal user website preferences, the method comprising:
receiving, by a computing device processor, inputs that define, for a user, one or more universal website preferences that are configured to be applied to all websites having a predetermined relationship with a universal website preference managing entity, wherein inputs define the universal website preferences that include user-defined preferences, a preferred geographic location, a preferred language, and preferred authentication credentials;
storing, in computing device memory, the one or more universal website preferences in a user profile associated with the user;
determining, by a computing device processor, that the user is a universal website preference participant by identifying a cookie stored on a device from which the user is initiating communication with one of the websites, wherein the cookie identifies the user as the universal website preference participant;
in response to determining that the user is a universal website preference participant, receiving at an edge server, by a computing device processor, first tag parameters that indicate that the user is initiating communication with one of the websites having the predetermined relationship with the universal website preference managing entity;
retrieving, by a computing device processor, the one or more universal website preferences from the user profile; and
communicating from the edge server, by a computing device processor, second tag parameters, to the website, that indicate the one or more universal website preferences, wherein the website applies the universal website preferences, including the user-defined preferences, the preferred authentication credentials, the preferred language and the preferred geographic location, at an onset of a website session conducted by the user without requiring any input or authentication at the website by the user, wherein application of the preferred geographic location provides for location-specific information specific to the preferred geographic location to be provided during website communication and application of the preferred language provides for content presented on the website to be presented in the preferred language during the website communication.

6. The method of claim 5, wherein receiving the inputs further comprises receiving, by the computing device processor, the inputs that define the one or more universal website preferences, wherein the preferences include preferred billing information.

7. The method of claim 5, further comprising receiving, by a computing device processor, website interaction data related to the website session conducted by the user and storing, in the computing device memory, the website interaction data in the user profile.

8. The method of claim 7, further comprising determining, via a computing device processor, targeted offers to provide to the user during one of the website session or any subsequent website session based on the universal website preferences and the website interaction data.

9. A computer program product, the computer program product comprising a non-transitory computer-readable medium having computer-executable instructions to cause a computer to implement the steps of:
receiving inputs that define, for a user, one or more universal website preferences that are configured to be applied to all websites having a predetermined relationship with a universal website preference managing entity, wherein inputs define the universal website preferences that include a preferred geographic location, and a preferred language;
storing the one or more universal website preferences in a user profile associated with the user;
determining that the user is a universal website preference participant by identifying a cookie stored on a device from which the user is initiating communication with one of the websites having the predetermined relationship with the entity implementing the module, wherein the cookie identifies the user as the universal website preference participant;
in response to determining that the user is a universal website preference participant, receiving, at an edge server, first tag parameters that indicate that the user is initiating communication with a website having the predetermined relationship with the universal website preference managing entity;
retrieving the one or more universal website preferences from the user profile; and
communicating, from the edge server, second tag parameters, to the website, that indicate the one or more universal website preferences, wherein the website applies the universal website preferences, including the user-defined preferences, the preferred authentication credentials, the preferred language and the preferred geographic location, at an onset of a website session conducted by the user without requiring any input or authentication at the website by the user, wherein application of the preferred geographic location provides for location-specific information specific to the preferred geographic location to be provided during website communication and application of the preferred language provides for content presented on the website to be presented in the preferred language during the website communication.

10. The computer program product of claim 9, wherein the step of receiving the inputs further comprises receiving the inputs that define the one or more universal website preferences, wherein the preferences include preferred billing information.

11. The computer program product method of claim 9, wherein the steps further comprise receiving website interaction data related to the website session conducted by the user and storing the website interaction data in the user profile.

12. The computer program product of claim 11, wherein the step further comprise determining targeted offers to provide to the user during one of the website session or any subsequent website session based on the universal website preferences and the website interaction data.

* * * * *